US009259987B2

(12) United States Patent
Nettelmann et al.

(10) Patent No.: US 9,259,987 B2
(45) Date of Patent: Feb. 16, 2016

(54) METHOD FOR MONITORING AND CONTROLLING A PNEUMATIC RIDE-HEIGHT CONTROL SYSTEM OF A CHASSIS SYSTEM

(75) Inventors: Marc Nettelmann, Alfeld (DE); Werner Schünemann, Winsen (DE); Oliver König, Hannover (DE); Hermann Hoinkhaus, Burgwedel (DE); Ralph Tepe, Hannover (DE)

(73) Assignee: Continental Teves AG & Co. oHG (DE)

( * ) Notice: Subject to any disclaimer, the term of this patent is extended or adjusted under 35 U.S.C. 154(b) by 160 days.

(21) Appl. No.: 14/122,149

(22) PCT Filed: May 23, 2012

(86) PCT No.: PCT/EP2012/059530
§ 371 (c)(1),
(2), (4) Date: Feb. 12, 2014

(87) PCT Pub. No.: WO2012/163742
PCT Pub. Date: Dec. 6, 2012

(65) Prior Publication Data
US 2014/0163820 A1     Jun. 12, 2014

(30) Foreign Application Priority Data

May 27, 2011   (DE) .......................... 10 2011 076 617
Oct. 18, 2011   (DE) .......................... 10 2011 084 669

(51) Int. Cl.
*G06F 7/00*     (2006.01)
*B60G 17/015*   (2006.01)
(Continued)

(52) U.S. Cl.
CPC ............ *B60G 17/0155* (2013.01); *B60G 11/27* (2013.01); *B60G 17/0185* (2013.01);
(Continued)

(58) Field of Classification Search
CPC .................. B60G 17/00; B60G 11/26

USPC ........................... 267/64.16; 280/707
See application file for complete search history.

(56) References Cited

U.S. PATENT DOCUMENTS 4,659,104 A * 4/1987 Tanaka ............... B60G 17/0185
                                                    280/5.501
4,827,416 A   5/1989 Kawagoe
(Continued)

FOREIGN PATENT DOCUMENTS

DE        3825280 A1    2/1990
DE       19525835 A1    1/1997
(Continued)

OTHER PUBLICATIONS

International Search Report mailed Aug. 22, 2012 for PCT/EP2012/059530.

*Primary Examiner* — Thomas G Black
*Assistant Examiner* — Ana Thomas
(74) *Attorney, Agent, or Firm* — RatnerPrestia

(57) ABSTRACT

A method for monitoring and controlling a chassis pneumatic ride-height control system. Repeatedly measuring a current height of the chassis; detecting when the current height of the chassis exceeds at least one predefined height threshold. A time interval threshold is associated with the height threshold; repeatedly measuring a time interval in which the current height of the chassis exceeds the predefined height threshold; detecting when the measured time interval exceeds the predefined time interval threshold associated with the predefined height threshold; repeatedly checking whether both the height threshold and the associated time interval threshold are exceeded, and if so, preventing the current height of the chassis from rising further and/or increasing stability of the chassis; deactivating the measures when the repeated check shows that the current height of the chassis is below the at least one height threshold and the associated time interval threshold.

11 Claims, 4 Drawing Sheets

(51) Int. Cl.
*B60G 11/27* (2006.01)
*B60G 17/0185* (2006.01)
*B60G 17/052* (2006.01)

(52) U.S. Cl.
CPC ........ *B60G17/052* (2013.01); *B60G 2202/152* (2013.01); *B60G 2400/252* (2013.01); *B60G 2600/02* (2013.01); *B60G 2600/08* (2013.01); *B60G 2800/914* (2013.01)

(56) References Cited

U.S. PATENT DOCUMENTS 5,130,927 A 7/1992 Kunishima
6,224,044 B1 5/2001 Heilenkotter
7,192,012 B2 * 3/2007 Bolt ................. B60G 11/27
267/64.16

FOREIGN PATENT DOCUMENTS

| DE | 10338875 | A1 | 3/2005 |
| DE | 102004051740 | A1 | 9/2006 |
| DE | 102008036041 | A1 | 2/2010 |
| EP | 0318013 | A2 | 5/1989 |
| EP | 0397181 | A1 | 11/1990 |
| JP | 6311213 | | 1/1988 |
| JP | 02-057415 | | 2/1990 |
| JP | 02296519 | | 12/1990 |
| JP | 2000211336 | | 8/2000 |

\* cited by examiner

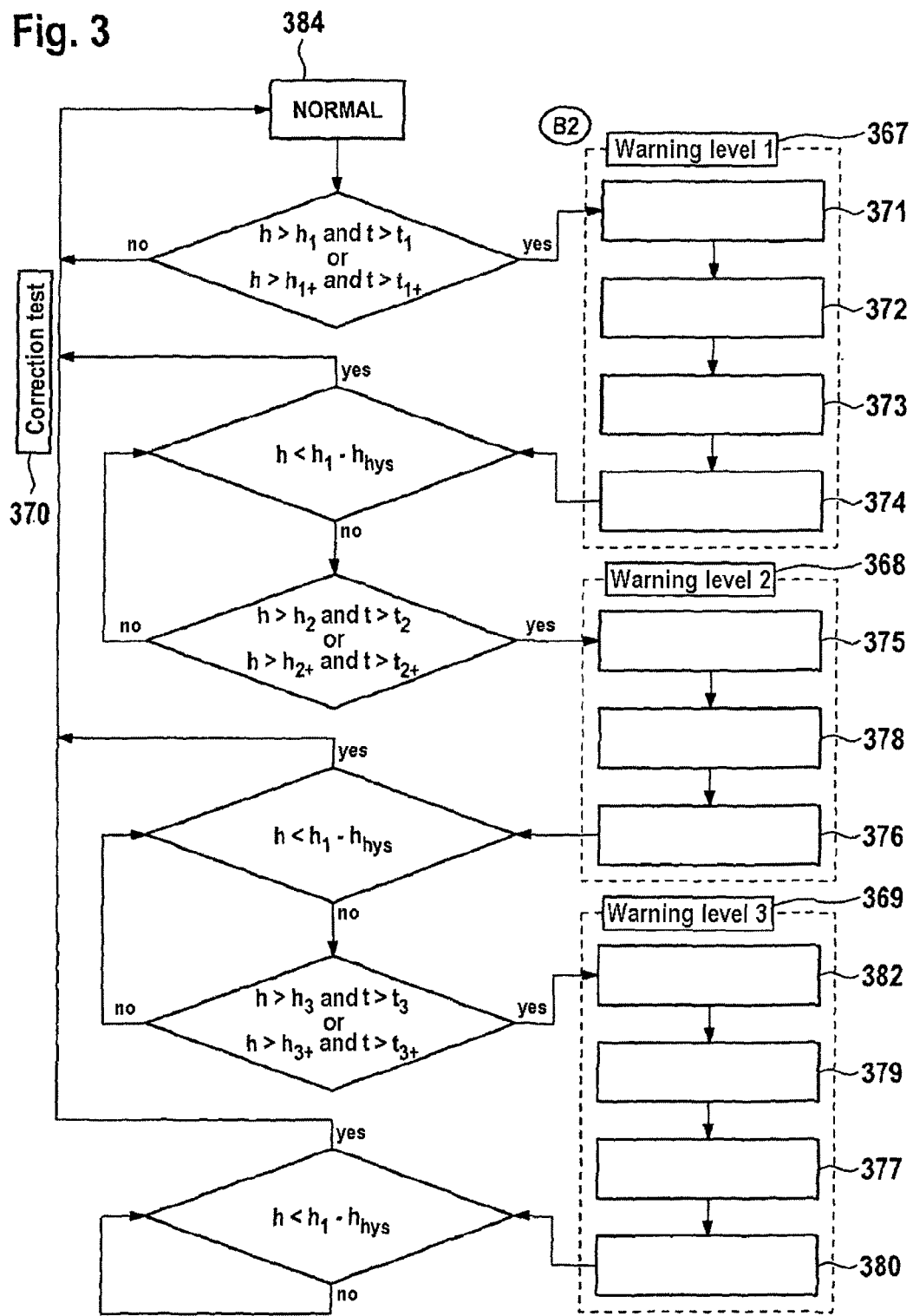

METHOD FOR MONITORING AND CONTROLLING A PNEUMATIC RIDE-HEIGHT CONTROL SYSTEM OF A CHASSIS SYSTEM

CROSS REFERENCE TO RELATED APPLICATIONS

This application is the U.S. National Phase Application of PCT/EP2012/059530, filed May 23, 2012, which claims priority to German Patent Application No. 10 2011 076 617.0, filed May 27, 2011 and German Patent Application No. 10 2011 084 669.7, filed Oct. 18, 2011, the contents of such applications being incorporated by reference herein.

FIELD OF THE INVENTION

The invention relates to a method for monitoring and controlling a pneumatic ride height control system of a chassis system, a device for monitoring and controlling a pneumatic ride height control system of a chassis system and a computer program product.

BACKGROUND OF THE INVENTION

ISO 26262, an ISO standard for safety-relevant electrical/electronic systems in motor vehicles, calls for the performance of a hazard analysis and risk estimation within its process framework and procedure model. For this purpose the potential hazards of the electrical/electronic system of a motor vehicle must be identified. This is done by observing the malfunctions of the system under investigation in specific hazard situations. Then each hazard is classified with a safety requirement level in four categories or is classified as not being safety-relevant. In ISO 26262 the risk analysis takes place by means of a specified qualitative methodology. For this purpose for each identified hazard the severity of the effect, the frequency of the hazard situation and the manageability of the malfunction in the respective hazard situation, for example by the driver, must be individually estimated. From a specified table for each hazard the classification can be read out as not safety-relevant (QM—Quality Management) or as a hazard of a certain class (ASIL class A-D), wherein ASIL stands for Automotive Safety Integrity Level.

With increasing ASIL the requirements on safety also increase. According to the current prior art, there is currently no computer-implemented method that carries out a continuous hazard analysis and risk estimation of the system according to the classification system of ISO standard 26262, an assessment of the potential hazard according to the ISO standard 26262 in a safety-relevant electrical/electronic system of a motor vehicle, for example a pneumatic ride height regulating system of a chassis system, and automatically implements the methods provided by the process framework and the procedure model of ISO standard 26262 to fulfil the respective safety requirement.

SUMMARY OF THE INVENTION

In contrast, an aspect of the invention is to provide an improved method for monitoring and controlling a pneumatic ride height control system of a chassis system, an improved device for monitoring and controlling a pneumatic ride height control system of a chassis system and an improved computer program product.

A computer-implemented method for monitoring and controlling a pneumatic ride height control system of a chassis system is provided, wherein the method comprises the steps:
- repeated measurement of an actual ride height of the chassis system,
- detecting when at least one predefined ride height threshold value is exceeded by the actual ride height of the chassis system, wherein a time interval threshold value is assigned to the ride height threshold value,
- repeated measurement of a time interval in which the current ride height of the chassis system exceeds the at least one predefined ride height threshold value,
- detecting when the predefined time interval threshold value associated with the at least one predefined ride height threshold value is exceeded by the measured time interval,
- repeated checking of whether the at least one ride height threshold value and also the associated time interval threshold value are exceeded,
- and if this is the case, automatic activation of predefined technical measures, which are at least suitable to prevent a further increase of the current ride height of the chassis system and/or to increase a stability of the chassis system,
- deactivation of the automatically activated measures if the repeated checking reveals that the current ride height of the chassis system is below the at least one ride height threshold value and the associated time interval threshold value.

According to embodiments of the invention, a monitoring and control mechanism is thus provided for identification of hazard potentials and for risk assessment of incorrect ride height settings of a chassis system by a pneumatic ride height regulating system with simultaneous activation of predefined control countermeasures for lowering the safety risk resulting from an excessive ride height of the chassis system. The described method thus carries out according to the requirements of ISO 26262 a repeated hazard analysis and risk estimation in relation to the ride height of a chassis system, wherein above all situations are classified as hazardous in which the vehicle is assessed as "critical in terms of driving dynamics" to "undrivable" because of a ride height that is too high. A ride height that is significantly above the range of adjustment is thereby classified as a significantly too high ride height of the chassis system of the vehicle, with which the vehicle exhibits severe oversteering driving behavior (if the rear axle is much too high) or understeering driving behavior (if the front axle is much too high). Whereas understeering driving behavior is indeed generally not classified as so critical, oversteering driving behavior implies a high hazard classification. Oversteering driving behavior thus does not represent an envisaged system behavior and would occur because of a fault.

According to the rules of a quality management system, a classified error analysis, the automatic activation of countermeasures and a metrological evaluation of the activated countermeasures are carried out in a repeating manner. This has the advantage that the requirements of ISO standard 26262 are fulfilled in an efficient manner. By the definition of ride height threshold values and time interval threshold values a measurable criterion is provided for quantitative assessment of safety risks of an electrical/electronic system, in this case of a pneumatic ride height regulating device of a vehicle. The repeated target/actual comparison in relation to the ride height of the chassis system, the detection of exceeding predefined ride height threshold values and time interval threshold values for identification of faulty ride height settings, the automatic activation of measures that reduce the ride height and/or increase the stability of the vehicle, the repeated metrological evaluation of the activated countermeasures and automatic deactivation of the activated measures once the fault has been eliminated represent a suitable realization of all phases (Plan, Do, Check, Act) of the quality and error management system required by ISO 26262.

According to one embodiment of the invention, during the repeated measurement of the current ride height of the chassis system a frequency assessment of measured height signals is carried out, wherein an influence of driving dynamic variables is assessed for different driving maneuvers and/or a weight-related degree of load of the chassis system is taken into account.

This can have the advantage that not only the measured ride height alone, but also other influencing variables are taken into account for the identification of an incorrect ride height adjustment. For a classification as a safety risk there is an assessment of the frequency of the measured height signals, which represent the current ride height of the chassis system, taking into account changing driving dynamic variables for different driving maneuvers (e.g. constant speeds, decelerations, accelerations, starting, braking maneuvers, gear shifts, straight line travel, left and right turns with different lateral acceleration), taking into account the road properties (e.g. smooth asphalt, asphalt trails, coarse cobblestones, fine cobblestones, poor roads, running into curbs) and taking into account the load state of the vehicle (e.g. driver only, two persons and luggage, full load, towing operation). For assessment of a current ride height of the chassis system on exceeding set ride height threshold values, not only is exceeding time interval threshold values considered, but the vehicle behavior and external circumstances are also considered. This can also have the advantage that the number of erroneous error messages is reduced.

According to one embodiment of the invention, in cases of a lowering of the current ride height of the chassis system hysteresis behavior of the measured height signals is taken into account during an assessment of frequencies of the measured height signals to determine whether the measured height signals fall below the predefined ride height threshold value (267).

This can have the advantage that an error message is not immediately output as a reaction to a deviation from target in the event of a merely short-term period of exceeding a threshold value, but that it can be decided whether it is a definite case of exceeding a threshold value or not depending on further subsequent height signals according to their measurement value. The consideration of hysteresis behavior during measurement of the height signal enables the elimination of influences of control oscillations resulting for example from mechanical play in the pneumatoric actuator system or a measurement inaccuracy of the height sensors. A delayed reaction to a deviation from target of the current ride height can thus be formed by assessing further height signals, which additionally reduces the rate of error messages.

According to one embodiment of the invention, the method further comprises repeated monitoring and identification of processes and components of a pneumatic actuator system of the pneumatic ride height control system.

This can have the advantage that the identification of a safety risk is not only carried out using a measurement of the pneumatic level, but also by monitoring the technical process within the pneumatic control device. Thus the detection of a safety risk can also be performed for example by monitoring the spring strut position or even by the identification of a control process towards a hazardous and highly critical region, for example with an approach to the rebound stop. On the other hand the monitoring and identification of processes and components of the pneumatic ride height regulating device, for example detection of a control process in the operating mode of a closed air supply by means of identifying the switching state of a valve, can be used for error analysis of a height signal lying above a threshold value.

Furthermore, the monitoring and identification of processes and components of the pneumatic control device are advantageous for the identification of suitable technical measures for the elimination or reduction of the safety risk. Thus for example by identification of an active valve during upward control according to the pneumatic switching, erroneous upward control of the chassis system can be detected and a further upward control can be inhibited. The repeated monitoring and identification of processes and components of the pneumatic control device thus enables the identification of causes of an incorrect ride height adjustment. Thus for example following the detection of incorrect upward control by means of the identification of a valve position a technical countermeasure can be performed, for example changing the switching state of the valve to activate the downward control process of the chassis system.

By repeated monitoring and identification of processes activated as countermeasures, a check of the corrective effect can also take place, whereby a simultaneous verification can take place using a change of the measured rest signal and a traceable changed position of components of the pneumatic ride height regulating device. Height signal measurements and repeated monitoring and identification of processes and components of the pneumatic control device are thus complemented by the identification and classification of safety risks, by the error analysis and by the activation of countermeasures for restoration of the functional safety of a chassis system.

According to one embodiment of the invention, the technical measures include, for cases in which the current ride height of the chassis system exceeds the at least one ride height threshold value and the associated time interval threshold value:

controlling the processes and components of the pneumatic actuator system of the pneumatic control system, activating an auxiliary system for ensuring the stability of the chassis system, especially electronic stability programs and/or a control adjustment of vehicle components for reduction of a speed of the chassis system.

Following the identification of a safety-critical ride height, different types of countermeasures for the elimination or reduction of the safety risk of the chassis system can be activated by the described method. Thus for example the upward control process can be terminated by deactivating the pneumatic actuator system. On the other hand, for a known safety risk activating the electronic stability control system previously deactivated by the user of the vehicle can be forced automatically. Another category of countermeasures relates to engine management, wherein for example the speed is automatically limited in the event of a hazard.

This can have the advantage that, depending on the classification and level of criticality of the safety risk, all countermeasures can either be activated simultaneously, in a suitable combination or individually. The measures or actions that can be undertaken or activated by the described monitoring and control mechanism can be project-specifically prioritized according to the wishes of the user of the vehicle and can be adapted to the respective vehicle behavior.

According to one embodiment of the invention, the method also comprises an assessment of the activated technical measures.

This has the advantage that not only are the requirements of ISO standard 26262 with respect to repeated evaluation of measures satisfied, but that also technical measures that may adversely affect the driving quality of the vehicle are made reversible after the safety risk has been eliminated.

According to one embodiment of the invention, in the event of exceeding the at least one ride height threshold value and the associated time interval threshold value, predefined fault entries are set for recording and/or for fault diagnosis.

This can have the advantage that for example a fault diagnosis can be made faster using set fault codes, logging and forming a history of occurring faults are enabled and/or even automatic error code based emergency measures can be started.

According to one embodiment of the invention, in the event of exceeding the at least one ride height threshold value and the associated time interval threshold value, predefined warning levels are set for the classification of said exceeding event, wherein depending on the warning levels at least one of the predefined technical measures is activated that is suitable for reducing the current ride height of the chassis system below the at least one ride height threshold value and/or for increasing a stability of the chassis system.

The definition of different warning levels and an assignment of identified incorrect ride height settings implements the classification of the safety risk required by ISO standard 26262, for example in ASIL classes A to D. At the same time suitable technical measures for lowering the ride height of the chassis system and/or for increasing the stability of the chassis system can be activated depending on the degree of severity of the safety risk classification. The disclosed invention thus includes the rules required by ISO standard 26262 for ASIL decomposition as well as rules for criticality analysis. A possible embodiment of the setting of different warning levels can for example also be technically implemented with different audible signals and/or warning lamps that illuminate in different colors.

According to one embodiment of the invention, on exceeding the at least one ride height threshold value and the associated time interval threshold value, at least one information signal and/or at least one command are sent to other interfaces that can be defined and that are suitable for activating measures for lowering the current ride height and/or for increasing the stability of the chassis system.

This can have the advantage that the identification of an incorrect ride height adjustment of a chassis system is possible via any interfaces that can be defined into other parts of an existing software architecture by means of an information signal (e.g. an audible signal or a yellow warning lamp) and/or a command to activate countermeasures that are controlled by external software components is possible. Thus, for example, in a combination instrument the user of the vehicle can be provided with specific instructions for the manual activation of countermeasures. At the same time the user of the vehicle can receive timely information for any measure using transmitted text messages.

By means of such further interfaces that can be defined, information regarding the identification of errors in the ride height adjustment and/or activated measures could be communicated to other systems of the vehicle, whereby the coordination of the various systems of the vehicle would be enabled. At the same time an interface compatibility of the disclosed invention could enable the encapsulation of the method expressed in an algorithm within special safety software, which for example would be switched in parallel with purely functional software and would have no cross-connection to other software within the environment. Thus the possibility would at the same time be provided to obtain or even to exchange already existing software parts of a software architecture in a vehicle without having to change the safety relevant functionality. At the same time this could be tested at low cost, more comprehensively, in a qualified manner and more efficiently by a parallel arrangement and encapsulation of the safety software than would ever be allowed by the qualification and testing of all the software.

In another aspect the invention relates to a computer program product with instructions that can be executed by a processor for performing the method described above.

In another aspect the invention relates to a control device for monitoring and controlling a pneumatic control system of a chassis system with:
  a means for repeated measurement of a current ride height of the chassis system,
  a means of detecting the current ride height of the chassis system exceeding at least one predefined ride height threshold value, wherein a time interval threshold value is associated with the ride height threshold value,
  a means of repeated measurement of a time interval in which the current ride height of the chassis system exceeds at least the one predefined ride height threshold value,
  a means of detecting the time interval exceeding the predefined time interval threshold value associated with the at least one predefined ride height threshold value,
  a means of repeated checking of whether both the at least one ride height threshold value and also the associated time interval threshold value are exceeded,
  a means of automatic activation of predefined technical measures that are suitable for lowering the current ride height of the chassis system below the at least one ride height threshold value and/or for increasing a stability of the chassis system if both the at least one ride height threshold value and also the associated time interval threshold value are exceeded,
  a means of deactivating the automatically activated measures if the checking reveals that the current ride height of the chassis system is below the at least one ride height threshold value and the associated time interval threshold value.

BRIEF DESCRIPTION OF THE DRAWINGS

Preferred embodiments of the invention are explained in detail below using the following figures. In the figures:

FIG. 3 shows a flow diagram for illustrating the activation of the individual warning levels.

DETAILED DESCRIPTION

Figure 1:
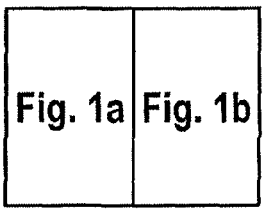
FIG. 1 shows a block diagram for illustrating the software architecture with embedded safety software for monitoring and controlling a pneumatic ride height control system of a chassis system.
Figure 1:
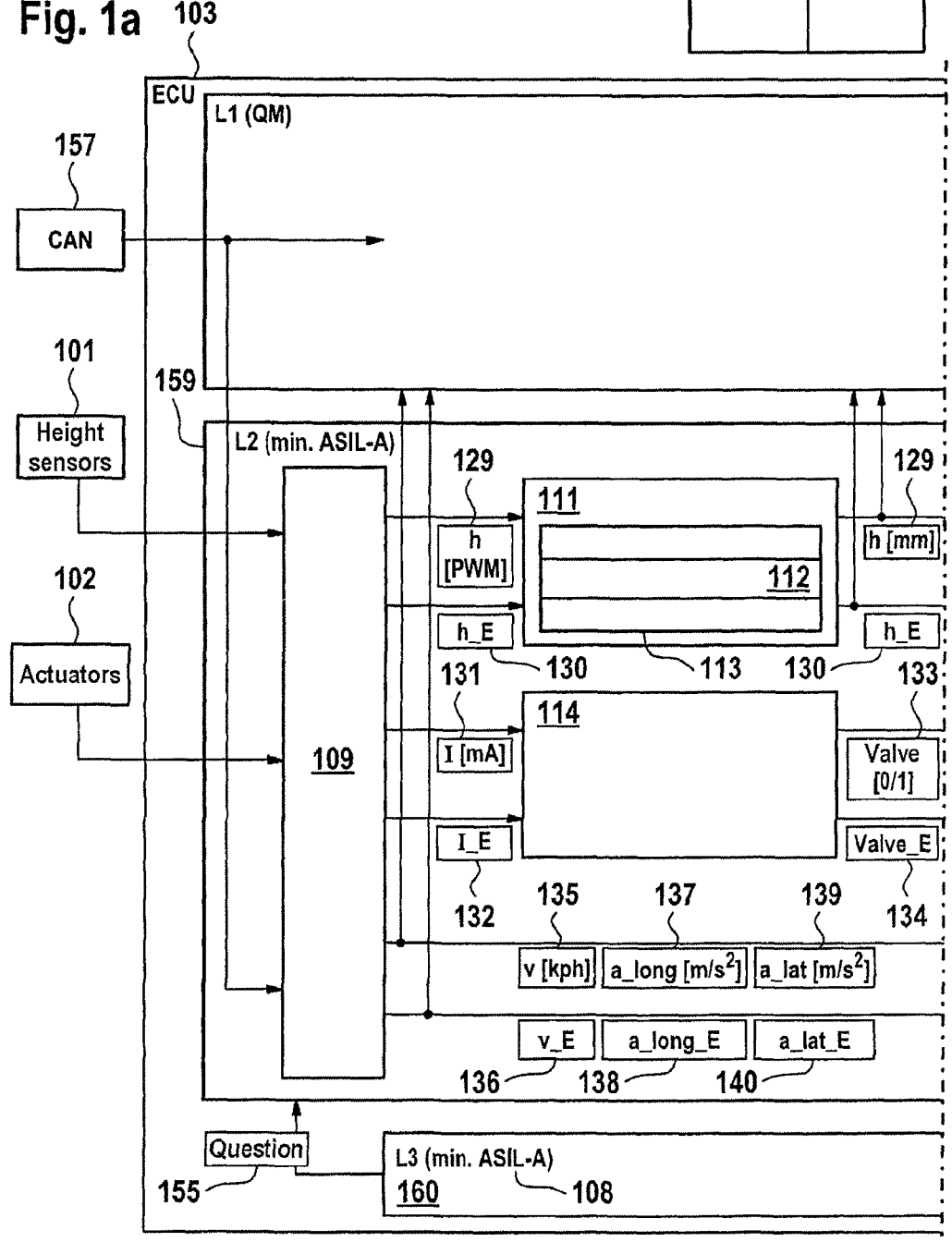
Figure 1B:
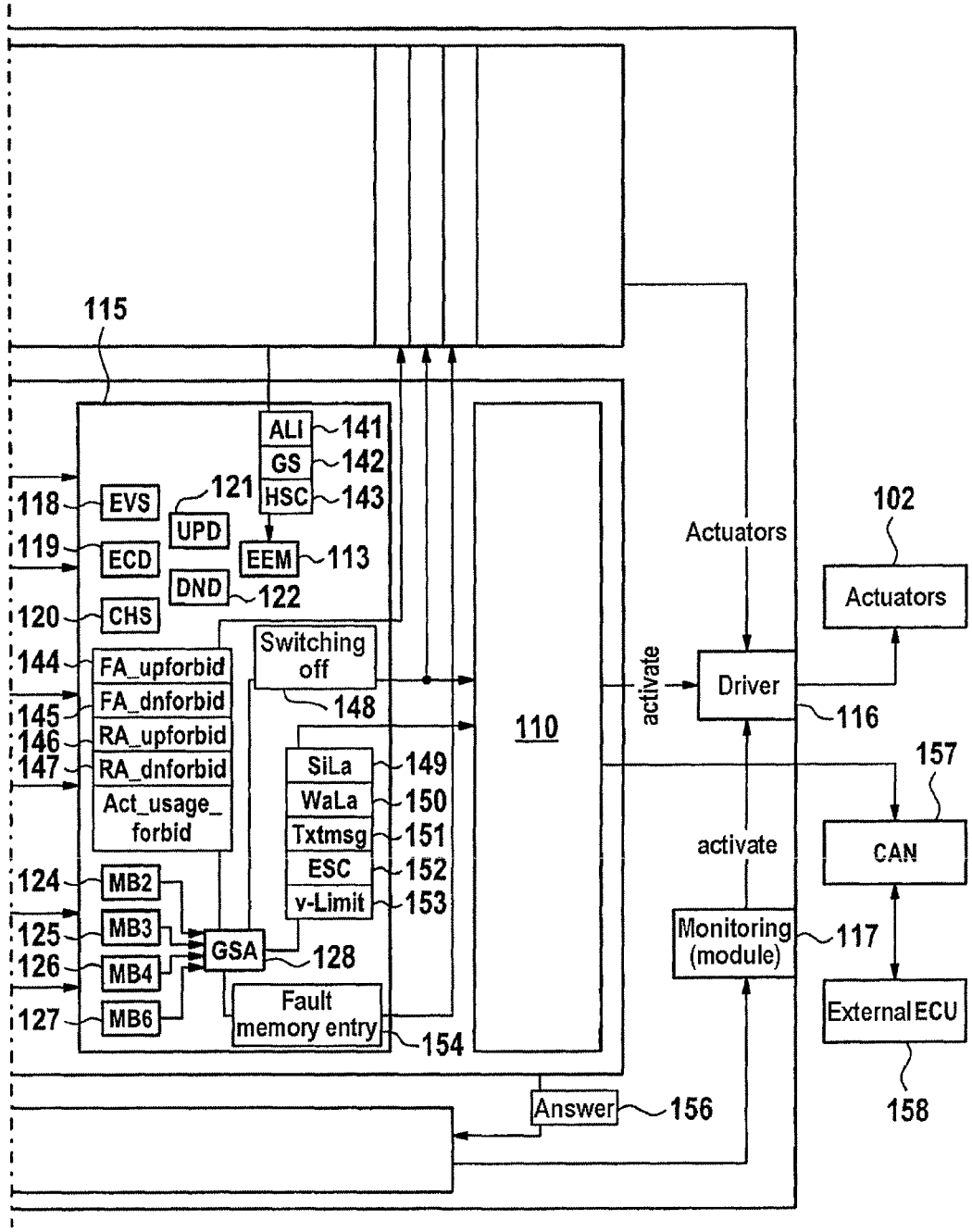

FIG. 1 shows a block diagram for illustrating the interfaces of the safety software 115 to the pneumatic actuator system [Actuators] 102 via an input point [ASIL Input Interface] 109 and a valve switching state evaluation module [Functionality: Valve State Processing Unit] 114, as well as to the height sensors [Height Sensors] 101 via the ASIL input point [ASIL Input Interface] 109 following a pulse-width modulation [Conversion PWM to Height] in the functionality module 111. Here a field bus system [CAN] 157 provides an interface both to the classification level [L1 (QM)] 107 of the electronic control unit [ECU] 103 and also to the classification level [L2 (min. ASIL-A)] 159 with at least one classification of the safety risk in class ASIL-A [L3 (min. ASIL-A)] 108.

The functionalities of the electronic control unit [ECU] 103 are shown depending on the classification of the safety risk in cases of the classification as "not safety-relevant" with classification level QM [L1 (QM)] 107, for classification of the safety risk in at least the class ASIL-A with classification level [L2 (min. ASIL-A)] 159 and subsequent assessment of a countermeasure in the form of an assessment of a response [Question] 156 with the delivery of a question [Question] 155 directed towards the ASIL input interface [ASIL Input Interface] 109.

The height sensors [Height Sensors] 101 send information relating to the measured ride height of the chassis system via the ASIL input interface [ASIL Input Interface] 109 to the conversion module 111, in which a pulse width modulation [Conversion PWM to Height], a sensor orientation [Sensor Orientation] by means of a sensor installation function 112 and a calibration [Height Sensor Calibration] 113 of the height sensors [Height Sensors] 101 take place. The pulse width modulated height information [h [mm]] is passed in step 129 to the safety software with safety monitor 115 with the simultaneous transfer of a height error status [h_E] 130.

From the pneumatic actuator system [Actuators] 102 information is provided about the current [I [mA]] 131 and the current error status [I_E] 132 to the valve switch state assessment module [Functionality: Valve State Processing Unit] 114 via the ASIL input interface [ASIL Input Interface] 109. Based on the valve switch state assessment module [Functionality: Valve State Processing Unit] 114, information relating to the valve switch state [Valve [0/1]] 133 and relating to the valve error status [Valve_E] 134 is provided to the safety software with safety monitor 115.

The safety module [Functionality: Safety Monitor] 115 contains in step [EVS] 118 an assessment of the valve state, in step [ECD] 119 an assessment of the vehicle dynamics, in step [CHS] 120 conditioning of the height signals, in step [UPD] 121 upward control detection and in step [DND] 122 downward control detection.

By means of the ASIL input interface [ASIL Input Interface] 109, information relating to the speed of the vehicle [v [kph]] 135, relating to the vehicle speed error status [v_E] 136, relating to the longitudinal acceleration [a_long [m/s$^2$]] 137, relating to the longitudinal acceleration error status [a_long_E] 138, relating to the lateral acceleration [a_/at [m/s$^2$]] 139 and relating to the lateral acceleration error status [a_lat_E] 140 are provided to the safety module [Functionality: Safety Monitor] 115 with safety monitor 115.

If there is a malfunction [MB2] 124, [MB3] 125, [M42] 126 and/or [MB6] 127, fault memory entries [FaultEntries] 154 are set, a command is issued to prevent upward control of the front axle [FA_upforbid] 144, a command is issued to prevent upward control of the rear axle [FA_dnforbid] 145, a command is issued to prevent downward control of the front axle [RA_upforbid] 146, a command is issued to prevent downward control of the rear axle [RA_dnforbid] 147, a switch-off [SwitchOFF] 148 is implemented, flashing of a signal lamp [SiLa] 149 is activated, a warning lamp [WaLa] 150 is activated, a text message [Txtmsg] 151 is sent, activation of an electronic stability program [ESC] 152 is forced and/or speed limiting [FaultEntries] 153 is implemented by means of the module for generating safety actions [GSA] 128.

The command for switching off 148 passes via the ASIL input interface [ASIL Output Interface] 110 by means of a driver module [Driver] 116 to the pneumatic actuator system [Actuators] 102, which indicates switching off the pneumatic actuator system [Actuators] 102. The commands for activation of a signal lamp [SiLa] 149, for activation of a warning lamp [WaLa] 150, for sending a text message [Txtmsg] 151, for forced activation of an electronic stability program [ESC] 152 and for limiting the speed [v-Limit] 153 pass via the ASIL output interface [ASIL Output Interface] 110 to the field bus system [CAN] 157, which among other things is connected to an external control network unit for engine control [External ECU] 158. The safety module [Functionality: Safety Monitor] 115 can thus move other hardware components of the vehicle to operate active engine management by issuing a command for limiting the speed. A monitoring module [WatchDog] 117 monitors the driver module [Driver] 116, which can cause manipulation of the pneumatic actuator system [Actuators] 102.

Figure 2:
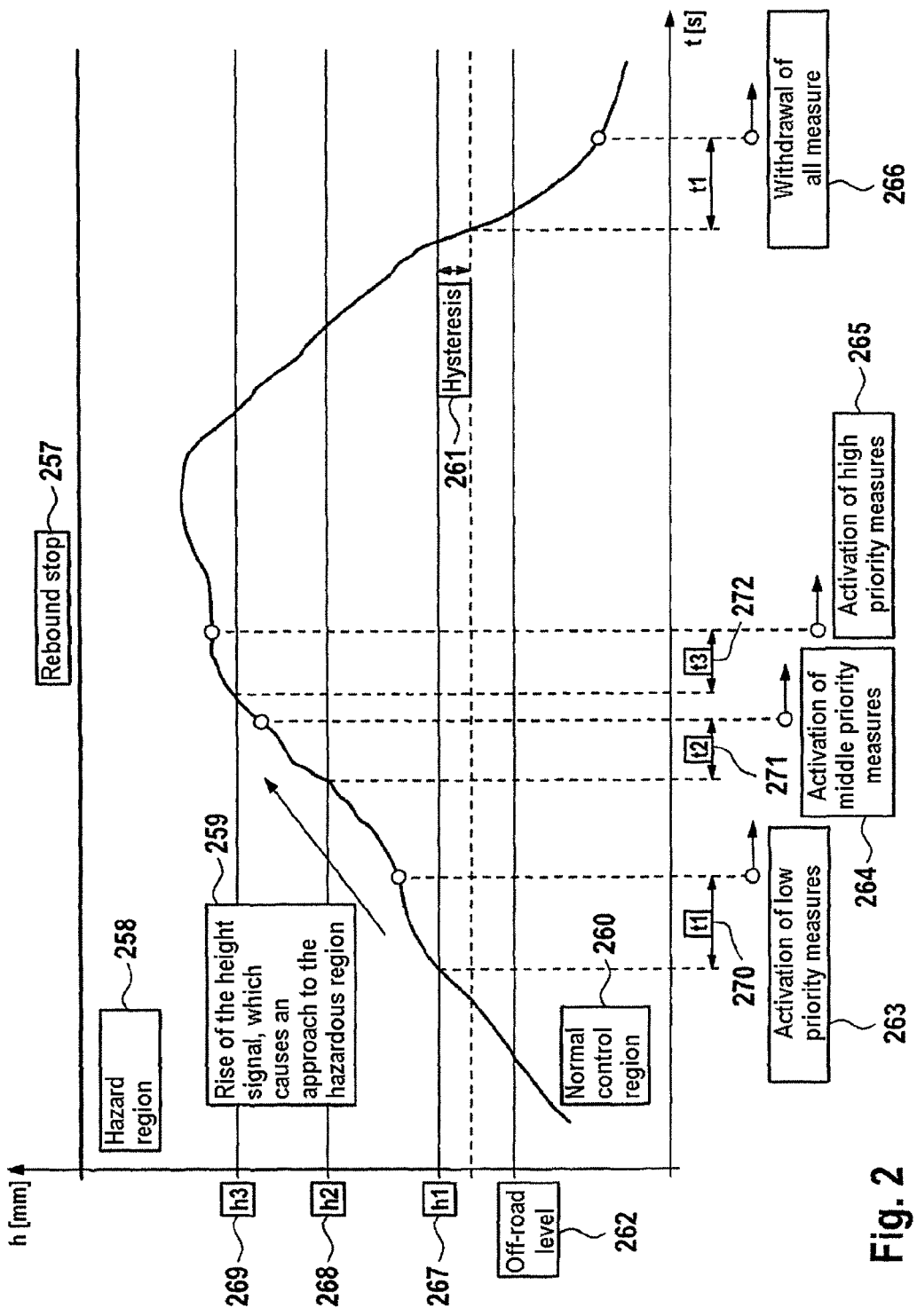
FIG. 2 shows a height signal profile in the case of an incorrect upwards control with an illustration of defined warning thresholds.

FIG. 2 shows an exemplary height signal profile for a chassis element with the designated warning levels h1, h2 and h3 267, 268, 269 with the respectively associated time interval threshold values t1, t2 and t3 270, 271, 272. The illustrated profile of the measured height signal could represent in its left subregion e.g. an incorrect upward control with successive subsequent exceeding of the first warning level h1 267, the second warning level h2 268 and the third warning level h3 269 with respective exceeding of the associated time interval threshold values t1, t2 and t3 270, 271, 272.

The height signal graph thereby passes through various zones. On the far left the height signal graph passes within the normal control region 260, which is bounded above by the off-road level [Offroad level] 262. Here off-road level is a synonym for the highest regularly adjustable chassis level. Up to this limit there are regular level adjustments within the framework of the implemented control concept. Bounding on the off-road level [Offroad level] 262 above it is a zone in which a possible hysteresis behavior of the height signal is taken into account. The hysteresis behavior is basically only used here when deactivating, i.e. with the height signal falling below [h1-hysteresis]. When activating (exceeding the different threshold heights) no height hysteresis is taken into account. In the left region of the height signal profile graph the measured height signal value is definitely above the warning level h1 267 after time interval t1 270 has elapsed, so that a classification of the ride height of the chassis system as hazardous is made and suitable countermeasures 263 [Activate Low Priority Measures] are activated.

According to the illustrated height signal profile, said activated countermeasures do not appear to achieve a lowering of the current ride height of the chassis system, however, so that in the subregion [Rising up of the Height Signal leads to the Approach of the Hazardous Range] 259 of the height signal profile the height signal rises further and causes an approach to the hazardous region 258 [Hazardous Range]. In the illustrated height signal profile the warning level h2 268 is exceeded during the associated time interval threshold value t2 271, so that other countermeasures of middle priority 264 [Activate Middle Priority Measures] are automatically activated.

According to the illustrated height signal profile, said activated countermeasures of middle priority do not appear to be able to prevent a further rise of the current ride height of the chassis system, however, as can be seen by the warning level h3 being exceeded while the associated time interval t3 272 is significantly exceeded. Other countermeasures of high priority 265 [Activate High Priority Measures] are then automatically activated.

According to the right part of the illustrated height signal profile graph, the graph for illustrating the measured height signal now decreases continuously. Causes for the lowering of the ride height can be e.g.: a loss of air, downward control activity by the normal ride height controller (not by the safety software), a reduction in ride height as a result of falling temperature, etc. In the declining portion of the height signal profile graph the zone is traversed in which hysteresis behavior of the height signal is taken into account. Because the height signal recorded following the expiry of the time interval t1 is significantly below the warning level h1 267, the current ride height of the chassis system is no longer classified as hazardous to safety. All activated measures are now stopped in step 266 [Canceling all Measures]. The activated countermeasures for removing an incorrect upward control of the chassis system could prevent the measured height signal from reaching the critical zone in the vicinity of the rebound stop [Rebound Stop] 257 by means of a pneumatic control device. The rebound stop itself limits the geometric rebound capability, i.e. there are no height values beyond the rebound stop.

FIG. 3 shows a flow diagram for demonstration of the scheme for the continuously repeated target-actual comparison between the measured height signal and predefined ride height threshold values with simultaneous exceeding of predefined time interval threshold values, the classification of the measured height signal in different risk classes and the ride-dependent activation of countermeasures for the elimination of the safety risk.

A state is designated as a normal state [NORMAL] 384 (/*State0*/) in which there is no termination of upward control, no output or no transmission of speed limiting, no display in the combination instrument, no fault memory entry is issued and there is no Prio1 or Prio2 warning.

If a target-actual comparison between the measured height signal and the predefined warning level h1 267 while simultaneously exceeding the time interval t1 270 has shown that the height signal has definitely exceeded the warning level h1 367, then in step [Abort Up levelling] 371 a termination of the upward control is activated while simultaneously issuing an info fault memory entry [Fault-Entry Info] 372 and forcing the activation of an electronic stability program [ESC reenabling] 373.

Following withdrawal of the level control inhibition in step [Reset Level Control Forbid] 374, taking into account a hysteresis $H_{hys}$ the height signal is measured again and compared with the warning level h1. The withdrawal of the level control inhibition is provided here for electric vehicles, which e.g. force switch-off of the vehicle systems in the event of low battery charge. If the logic of an electric vehicle has switched off the level controller, this inhibition must be withdrawn in the event of a fault, so that the system (at least for a short time) is given the capability of correcting the ride height using the normal level controller. If the system with the QM software has left the hazardous region, the level control can in turn be deactivated because of the limited residual energy.

If the assessment of the activated measures has shown that the ride height of the chassis system is significantly below the warning level h1, then a correction test [/*Proofed good*/] 370 takes place.

If the assessment of the activated measures shows, however, that the activated measures have not caused a reduction of the ride height of the chassis system, but instead of this the height signal has even exceeded the warning level h2 with the time interval threshold value t2 being simultaneously exceeded, then if warning level 368 occurs in step [Prio2-Warning] 375 a Prio2 warning is issued, in step [Fault Entry Low Prio] 378 a fault memory entry with low priority is performed and said warnings are displayed for the vehicle user in the combination instrument in step [Dashboard Msg.] 376.

If the subsequent assessment of the activated measures, taking into account a hysteresis $H_{hys}$, shows that the current measured height signal is definitely below the warning level h1 (h<[h1-hysteresis]), than a reparation test [/*Proofed good*/] 370 takes place.

If the assessment of the activated measures shows, however, that the height signal has risen further and has even exceeded the warning level h3 with the time interval t3 being simultaneously exceeded, then warning level 3 369 occurs and the following countermeasures are automatically activated: in step [Reset Prio2-Warning] 382 the Prio2 warning is withdrawn, which is replaced by a Prio1 warning in step 379 [Prio1-Warning]. Furthermore, a high priority fault memory entry takes place in step [Fault-Entry High Prio] 377 and in addition in step [Transmit Speed Limit] 380 a stability enhancing measure, namely the issuing of a command for limiting the speed, is issued.

Subsequently, the activated countermeasures are in turn assessed using a target-actual comparison and taking into account a hysteresis $H_{hys}$. If the assessment shows that the ride height of the chassis system is definitely below the warning level h1 (h<[h1-hysteresis]), then a correction test [/*Proofed good*/] 370 takes place. All countermeasures are stopped.

If the assessment of the activated measures shows, however, that the ride height of the chassis system has not reduced below the warning level h1 (h<[h1-hysteresis]), then the activated countermeasures continue to remain active. A repeated assessment of the activated countermeasures takes place by means of a target-actual comparison taking into account a hysteresis.

The processes illustrated in the flow diagram are continuously repeated. The process steps illustrated in FIG. 3 correspond to the profile of a measured height signal illustrated in FIG. 2. The process steps illustrated in FIG. 3 could thus be representative of the elimination of an incorrect upward control of a chassis system by activating suitable countermeasures, which could be activated by the described monitoring and control mechanism depending on the respective exceeded warning level.

REFERENCE CHARACTER LIST

101 height sensors
102 actuators
103 electronic control unit
104 QM (Quality Management)
ASIL-A (Automotive Safety Integration Level A) (term from the legal standard ISO 26262)
109 input interface
110 output interface
111 pulse width modulation
112 sensor installation function
113 calibration of the height sensors
114 valve switch state assessment module
115 functionality monitoring and control in the "Safety Monitor"
116 driver (module)
117 monitoring (module)
118 assessment of the valve state 119 assessment of the vehicle dynamics
120 conditioning of the height signals
121 upward control detection
122 downward control detection
123 assessment of the controller operating mode
124 malfunction B2
125 malfunction B3
126 malfunction B4
127 malfunction B6
128 generating safety actions
129 height
130 height error status
131 current (I)
132 current error status
133 valve
134 valve error status
135 (vehicle) speed
136 vehicle speed error status
137 longitudinal acceleration
138 longitudinal acceleration error status
139 lateral acceleration
140 lateral acceleration error status
141 tape end activation
142 workshop mode
143 height sensor calibration
144 front axle upward control inhibition
145 rear axle upward control inhibition
146 front axle downward control inhibition
147 rear axle downward control inhibition
148 switching off
149 signal lamp
150 warning lamp
151 text message
152 electronic stability program
153 limiting the speed
154 fault memory entry
155 question
156 answer
157 field bus
158 external control unit for engine control
159, 160 classification level
257 rebound stop
258 hazard region
259 rise of the height signal, which causes an approach to the hazardous region
260 normal control region
261 hysteresis
262 off-road level
263 activation of low priority measures
264 activation of middle priority measures
265 activation of high priority measures
266 withdrawal of all measures
267, 268, ride height threshold values
269
  $h^1, h^2, h^3$
270, 271, 272 time interval threshold values $t^1, t^2, t^3$
  warning level 1
367
368 warning level 2
369 warning level 3
370 correction test
371 termination of upward control
372 info fault memory entry
373 forced activation of the electronic stability program
374 ride height control inhibition withdrawal
375 Prio2 warning
376 display in the combination instrument
377 high priority fault memory entry
378 low priority fault memory entry
379 Prio1 warning
380 output or send speed limit
382 withdraw Prio2 warning
384 normal state

The invention claimed is:

1. A method for monitoring and controlling a pneumatic ride height control system of a chassis system, wherein the method comprises the steps:
   repeatedly measuring, by sensors, a current ride height of the chassis system,
   detecting, by a processor, when a first predefined ride height threshold value is exceeded by the current ride height of the chassis system,
   detecting, by the processor, when a second predefined ride height threshold value, which is greater than the first threshold value, is exceeded by the current ride height of the chassis system,
   wherein a first time interval threshold value is associated with the first ride height threshold value and a second time interval threshold value is associated with the second ride height threshold value,
   repeatedly measuring, by the processor, a time interval in which the current ride height of the chassis system exceeds at least one of the first predefined ride height threshold value and the second predefined ride height threshold value,
   detecting, by the processor, when the first predefined time interval threshold value associated with the first predefined ride height threshold value is exceeded by the measured time interval,
   detecting, by the processor, when the second ride height threshold value is exceeded by the measured time interval,
   repeatedly checking, by the processor:
      whether both the first ride height threshold value and the associated first time interval threshold value are exceeded, and when both the first ride height threshold value and the associated first time interval threshold value are exceeded, automatically activating a first predefined technical measure that is suitable for at least one of preventing further raising of the current ride height of the chassis system and for increasing a stability of the chassis system, and
      whether the second ride height threshold value and the associated second time interval threshold value are exceeded, and when the second ride height threshold value and the associated second time interval threshold value are exceeded, automatically activating a second predefined technical measure that is suitable for at least one of preventing further raising of the current ride height of the chassis system and for increasing the stability of the chassis system,
   deactivating, by the processor, the automatically activated measures when the repeated checking, by the processor, reveals that the current ride height of the chassis system is below the first ride height threshold value minus a hysteresis and beyond an associated time interval threshold value.

2. The method as claimed in claim 1, wherein during the repeated measurement of the current ride height of the chassis system a frequency assessment of measured height signals is performed, wherein the influence of vehicle dynamic variables for different driving maneuvers is assessed and/or a degree of weight loading of the chassis system is taken into account.

3. The method as claimed in claim 1, wherein the method also comprises the repeated monitoring and identification of processes and components of a pneumatic actuator system of the pneumatic ride height control system.

4. The method as claimed in claim 1, wherein the predefined technical measures are further suitable for lowering the current ride height of the chassis system below at least one of the first and second ride height threshold value and/or to increase a stability of the chassis system.

5. The method as claimed in claim 1, wherein the technical measures, in cases in which the current ride height of the chassis system exceeds at least one of the first and second ride height threshold value and at least one of the associated first and second time interval threshold value, comprise:
- controlling the processes and components of the pneumatic actuator system of the pneumatic ride height control system,
- activating the auxiliary systems ensuring the stability of the chassis system, especially electronic stability programs, and/or
- a control adjustment of vehicle components for reduction of a speed of the chassis system.

6. The method as claimed in claim 1, wherein the method also comprises an assessment of the activated technical measures.

7. The method as claimed in claim 1, wherein on exceeding at least one of the first and second ride height threshold value and at least one of the associated first and second time interval threshold value, predefined fault entries are set for logging and/or for fault diagnosis.

8. The method as claimed in claim 1, wherein on exceeding at least one of the first and second ride height threshold value and at least one of the associated first and second time interval threshold value, predefined warning levels are set for classification of said exceeding event, wherein depending on the warning levels at least one of the predefined technical measures is activated that is suitable for lowering the current ride height of the chassis system below the at least one first and second ride height threshold value and/or for increasing a stability of the chassis system.

9. The method as claimed in claim 1, wherein on exceeding at least one of the first and second ride height threshold value and at least one of the associated first and second time interval threshold value, at least one information signal and/or at least one command, which are suitable for activating measures for lowering the current ride height and/or for increasing the stability of the chassis system, are sent to further interfaces that can be defined.

10. A computer program product with instructions that can be executed by a processor for performing process steps according to claim 1.

11. A control device for monitoring and controlling a pneumatic ride height control system of a chassis system comprising:
sensors for repeatedly measuring a current ride height of the chassis system,
processor for:
  detecting when a first predefined ride height threshold value is exceeded by the current ride height of the chassis system, and for detecting when a second predefined ride height threshold value, which is greater than the first threshold value, is exceeded by the current ride height of the chassis system,
  wherein a first time interval threshold value is associated with the first ride height threshold value, and a second time interval threshold value is associated with the second ride height threshold value,
  repeatedly measuring a time interval in which the current ride height of the chassis system exceeds at least one of the first predefined ride height threshold value and the second predefined ride height threshold value,
  detecting when the first predefined time interval threshold value associated with the first predefined ride height threshold value is exceeded by the measured time interval,
  detecting when the second predefined time interval threshold value associated with the second predefined ride height threshold value is exceeded by the measured time interval,
  repeatedly checking:
    whether both the first ride height threshold value and the associated first time interval threshold value are exceeded, and when both the first ride height threshold value and the associated first time interval threshold value are exceeded, automatically activating a first predefined technical measure that is suitable for at least one of preventing further raising of the current ride height of the chassis system and for increasing a stability of the chassis system, and
    whether the second ride height threshold value and the associated second time interval threshold value are exceeded, and when the second ride height threshold value and the associated second time interval threshold value are exceeded, automatically activating a second predefined technical measure that is suitable for at least one of preventing further raising of the current ride height of the chassis system and for increasing the stability of the chassis system,
  deactivating the automatically activated measures if the when the checking reveals that the current ride height of the chassis system is below the first ride height threshold value minus a hysteresis and beyond an associated time interval threshold value.

* * * * *